Sept. 20, 1938. K. H. BURGIN 2,130,874
TRAILER BRAKE CONTROL
Filed March 3, 1937
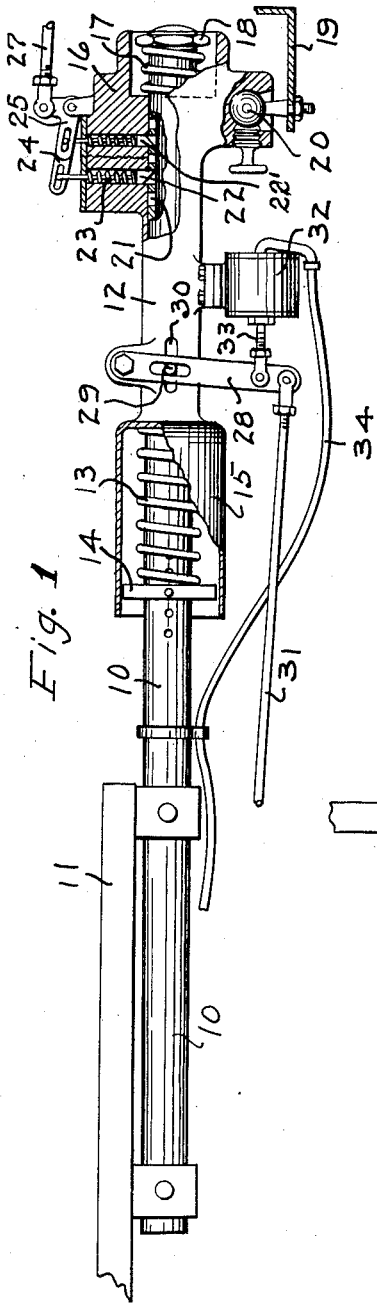
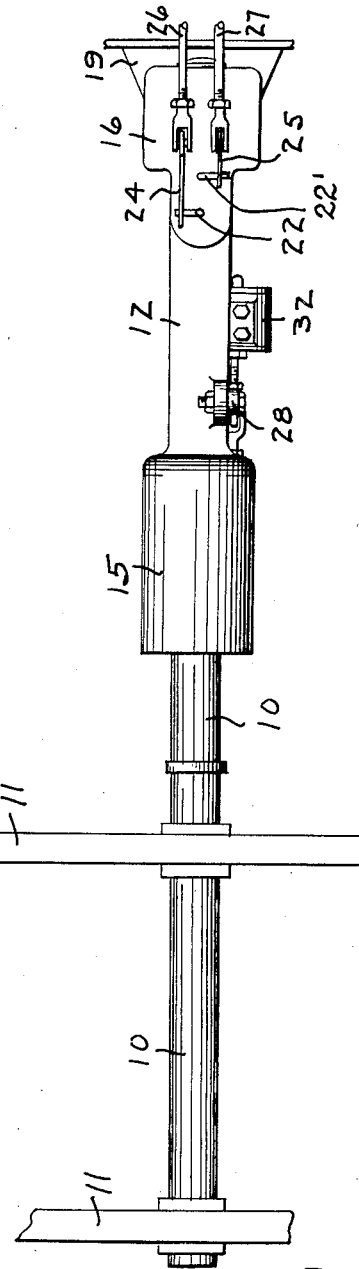
Inventor
Kermit H. Burgin,
By Minturn & Minturn,
Attorneys Patented Sept. 20, 1938

2,130,874

UNITED STATES PATENT OFFICE

2,130,874

TRAILER BRAKE CONTROL

Kermit H. Burgin, Zionsville, Ind.

Application March 3, 1937, Serial No. 128,710

3 Claims. (Cl. 188—142)

This invention relates to a trailer hitch and automatic trailer brake actuating means. A primary object of the invention is to provide an extremely simple and durable mechanism and one which will provide the utmost safety in actual operation.

A further primary object of the invention is to provide means for maintaining the brakes on the trailer in a set position when desired, releasable either at the hitch or from any suitable control in the tractor or automobile to which the trailer may be coupled. A still further primary object of the invention is to provide a control means which may be readily interconnected with any suitable control in the pulling car and which will not be affected by or subjected to varying lengths of the connecting means upon turning corners.

A still further important object of the invention is to provide a cushion effect in the coupling which may be thrown into use or out as may be desired under certain driving conditions.

These and other objects and advantages of the invention will become apparent to those versed in the art in the following description of the invention which is illustrated more or less diagrammatically in the accompanying drawing, in which Fig. 1 is a side elevation in partial section of the mechanism embodying the invention; and Fig. 2, a top plan view.

Like characters of reference indicate like parts throughout the several views in the drawing.

Referring to Figs. 1 and 2, a coupling pole or tongue 10 is fixed in a rigid manner to the trailer frame 11 to extend forwardly thereof. Slidably fitted over the forward end of the tongue 10 is a sleeve 12 which may be formed integrally by casting. A spring 13 is first slipped over the tongue 10 to extend therearound in helical manner to have its rear end bear against a collar 14 adjustably positioned along the tongue. The sleeve 12 is then brought back to have the rear enlarged housing 15 extend back over the spring and sleeve as a telescoping housing thereover. The front end of the spring 13 bears against the shoulder formed by the forward end of the housing 15 at its juncture with the sleeve proper.

The forward end of the sleeve 12 is provided with an enlarged head 16 having a central counterbore entering from its forward end to receive therein a compression spring 17 which abuts by its rear end the end of the counterbore and has an adjusting nut 18 brought up against the forward end of the spring. It is thus to be seen that the sleeve 12 is carried on the tongue 10 between the springs 13 and 17. The under side of the head 16 in the form herein shown is provided with any suitable coupling means with a pulling car member 19. The coupling means in the form herein shown comprises the usual ball 20 carried on the member 19 entering and being secured within the socket in the under side of the head 16.

The tongue 10 is provided with a plurality of notches or holes 21 to be in the path of one or more latch pins 22, 22', here shown as two in number, the rear latch pin 22' having its under side beveled so that as the tongue 10 may travel forwardly through the sleeve 12, the pin 22 may be raised and dropped into successive notches or holes 21 appearing thereunder. The forward pin 22' is beveled from its forward side so that this pin is raised by reverse or rearward travel of the tongue 10.

These latch pins 22, 22' are normally urged into engagement with the tongue 10 by means of springs 23. Lifting of the pins 22 is accomplished in any suitable manner such as by the respective bell cranks 24 and 25 which may be interconnected with suitable control rods or cables 26 and 27 to extend forwardly to any suitable controls (not shown) in the pulling car.

The joints between the bell-crank levers 24 and 25 and their respective rods 26 and 27, are sufficiently loose as shown in Fig. 2, to allow for the necessary disalignment without twisting of the rods and cranks in the turning of the forward vehicle relative to the trailer.

The sleeve 12 is provided with a swingable lever 28 movable fore and aft by travel of the tongue 10 through the sleeve 12. In the form herein shown, the tongue 10 is interconnected with the lever 28 by means of a pin 29, Fig. 1, extending outwardly from the tongue 10 through a slotted opening 30 in the sleeve 12. The lever 28 is employed to actuate the braking mechanism on the trailer and is equally adapted to be operable on either mechanical or hydraulic brakes. Where the trailer is equipped with mechanical brakes, a brake rod or cable 31 extending forwardly from the trailer braking mechanism may be directly hooked onto the lever 28 whereby forward travel of the tongue 10 through the sleeve 12 may serve to pull forwardly on the member 31 and thus apply the brakes. Where the trailer brakes are hydraulically operated, the fluid cylinder 32 may be directly attached to the sleeve 12 to have the piston rod 33 connected with the lever 28 whereby the desired pressure may be set up on the fluid in the cylinder 32 by forward travel of the lever 28 to have this pressure transmitted to the braking mechanism through the hose 34.

In operation, the sleeve 12 is attached to the car pulling member 19 so that there is no relative fore and aft movement between these two members. However when the pulling car slows down, the inertia of the trailer will cause the tongue 10 to slide forwardly through the sleeve 12 to overcome in part the resistance set up by the spring 13, the size and strength of this spring being so regulated as to permit the desired travel of the pin 29 in accordance with the weight of the trailer being pulled. To permit this relative travel between the tongue 10 and the sleeve 12, the forward latch pin 22 must necessarily be raised and held in the lifted position. With the rear pin 22' left under the influence of its spring 23, when the tongue 10 travels forwardly to apply the trailer brakes as above indicated, the pin 22 will drop into engagement with the respective notch 21 then presented thereunder so that the trailer brakes are then held in the set or applied position. Where this is not wanted for the particular operation, the rear pin 22' is held in the lifted position as well as the forward pin so as to permit the tongue 10 to travel rearwardly again when the pulling car moves forwardly, such as would be the case where the car and trailer are merely to be slowed down without coming to a full stop.

In starting up the pulling car, both the forward and rear pins 22, 22' are preferably held in the upper positions thereby permitting free play of the tongue 10 through the sleeve 12 subject to the control of the springs 13 and 17. In the forward pull on the sleeve 12, the tongue 10 is then pulled through the spring 17 and the nut 18 thereby giving a cushioned connection between the car and the trailer. Where this cushion effect would induce an intermittent surging effect under some road conditions, the forward pin 22 may be allowed to drop whereby the trailer would then be pulled directly in a rigid manner through the sleeve and pin 22, this connection then preventing the automatic application of the trailer brakes upon retardation of the pulling car speed.

While I have herein shown and described my invention in the form as now best known to me, it is obvious that structural changes may be made without departing from the spirit of the invention and I, therefore, do not desire to be limited to that precise form beyond the limitations as may be imposed by the following claims.

I claim:

1. A trailer coupling having an universal attachment with a pulling vehicle, consisting of a tongue fixed rigidly to the trailer, a housing telescoping over the tongue and making said attachment, a pair of springs spaced between abutments on the tongue, said housing being mounted between said springs, a member fixed to said tongue and extending through an opening in said housing, said opening permitting but limiting travel of the housing along the tongue, a brake actuating lever rockably mounted on said housing in the path of said member, a pair of latches carried by said housing adjacent said attachment, a plurality of latch abutments carried by said tongue, said latches being oppositely disposed whereby movement of said tongue through said housing is prevented when both latches are engaged with said abutments, and latch release means centered at said attachment.

2. A trailer coupling having an universal attachment with a pulling vehicle, consisting of a tongue fixed rigidly to the trailer, a housing telescoping over the tongue and making said attachment, a pair of springs spaced between abutments on the tongue, said housing being mounted between said springs, a member fixed to said tongue and extending through an opening in said housing, said opening permitting but limiting travel of the housing along the tongue, a brake actuating lever rockably mounted on said housing in the path of said member, a pair of latches carried by said housing adjacent said attachment, a plurality of latch abutments carried by said tongue, said latches being oppositely disposed whereby movement of said tongue through said housing is prevented when both latches are engaged with said abutments, and latch release means centered at said attachment, said housing having enlarged end bores receiving said springs therein, and said spring abutments comprising a rear collar secured to said tongue within the housing bore and a front adjustable collar shiftable along the tongue to compress both of said springs through the intervening housing.

3. A trailer coupling having an universal attachment with a pulling vehicle, consisting of a tongue fixed rigidly to the trailer, a housing telescoping over the tongue and making said attachment, a pair of springs spaced between abutments on the tongue, said housing being mounted between said springs, a member fixed to said tongue and extending through an opening in said housing, said opening permitting but limiting travel of the housing along the tongue, a brake actuating lever rockably mounted on said housing in the path of said member, a pair of latches carried by said housing adjacent said attachment, a plurality of latch abutments carried by said tongue, said latches being oppositely disposed whereby movement of said tongue through said housing is prevented when both latches are engaged with said abutments, and latch release means centered at said attachments, said latches being independently spring pressed toward said tongue, and said latch operating means comprising levers rockably mounted on the housing to disengage said latches and to be pivoted over said attachment.

KERMIT H. BURGIN.